United States Patent
Mori et al.

(10) Patent No.: US 6,544,426 B2
(45) Date of Patent: Apr. 8, 2003

(54) METHOD OF QUICKLY DECOMPOSING AND REMOVING AN ORGANIC CHLORINE COMPOUND BY A HOLLANDITE-TYPE PHOTOCATALYST

(75) Inventors: Toshiyuki Mori, Ibaraki (JP); Mamoru Watanabe, Ibaraki (JP); Jun Suzuki, Ibaraki (JP); Kenjiro Fujimoto, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 85 days.

(21) Appl. No.: 09/799,014

(22) Filed: Mar. 6, 2001

(65) Prior Publication Data

US 2001/0032820 A1 Oct. 25, 2001

(30) Foreign Application Priority Data

Mar. 27, 2000 (JP) ........................................ 2000-086195

(51) Int. Cl.[7] .................................................. C02F 1/30
(52) U.S. Cl. ........................ 210/748; 210/763; 210/908; 210/909; 405/128.5; 405/128.75; 405/129.25
(58) Field of Search ................................. 210/748, 763, 210/908, 909; 405/129.25, 128.5, 128.75

(56) References Cited

U.S. PATENT DOCUMENTS

| 5,130,031 | A | * | 7/1992 | Johnston ................... 210/748 |
| 5,501,801 | A | * | 3/1996 | Zhang et al. .............. 210/748 |
| 5,578,282 | A | * | 11/1996 | O'Young et al. ............ 423/50 |
| 5,705,078 | A | * | 1/1998 | Kurek et al. ................ 210/759 |
| 5,772,898 | A | * | 6/1998 | Lewis ......................... 210/762 |

* cited by examiner

Primary Examiner—Peter A. Hruskoci
(74) Attorney, Agent, or Firm—Oblon, Spivak, McClelland, Maier & Neustadt, P.C.

(57) ABSTRACT

A method of quickly decomposing and removing an organic chlorine compound, which comprises coating a liquid containing an organic chlorine compound on the surface of a photocatalyst so that the liquid does not flow, said photocatalyst comprising a hollandite-type crystal phase represented by the formula:

$$A_xM_yN_{8-y}O_{16}$$

(wherein A is at least one element selected from the group consisting of K, Rb, Cs, Ca, Ba and Na, M is a bivalent or trivalent metal element, N is an element which forms a rutile-type oxide, such as Ti, Sn or Mn, provided that A may be a Na element, only when M is Cr, and x and y satisfy $0.7 < x \leq 2.0$ and $0.7 < y \leq 2.0$, respectively), followed by irradiation with light in air so that the organic chlorine compound undergoes quick and complete oxidative destruction.

21 Claims, 1 Drawing Sheet

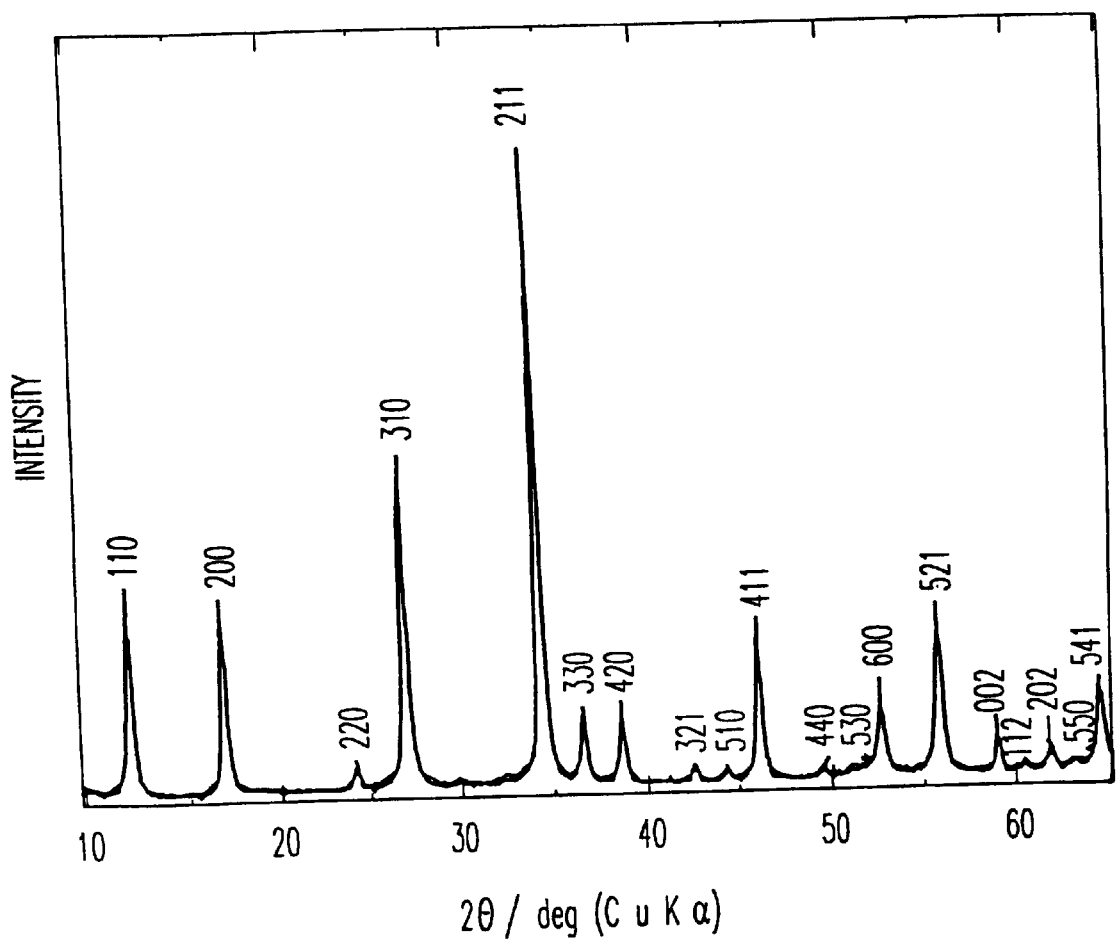

METHOD OF QUICKLY DECOMPOSING AND REMOVING AN ORGANIC CHLORINE COMPOUND BY A HOLLANDITE-TYPE PHOTOCATALYST

BACKGROUND OF THE INVENTION

1. Field of the Invention

The present invention relates to a method of quickly decomposing and removing an organic chlorine compound hazardous to the body, contained in e.g. ground water, river water, water in water supply and sewerage system, industrial waste water or contaminated soil, on a hollandite-type photocatalyst with a small amount of light energy so that the organic chlorine compound undergoes oxidative destruction more quickly and completely as compared with a method of bringing said photocatalyst into contact with an organic chlorine compound in a gaseous state, followed by irradiation with light for decomposition, or a method of bringing said photocatalyst into contact with an organic chlorine compound contained in a liquid by means of e.g. mixing, followed by irradiation with light for decomposition.

2. Discussion of Background

Attention has been paid to organic chlorine compounds as problematic endocrine disturbing chemicals, and risks of their carcinogenicity have conventionally been pointed out. Their representative examples include trichloroethylene and perchloroethylene.

Conventionally, as a method of removing an organic chlorine compound such as trichloroethylene in water, a method of completely oxidizing the organic chlorine compound by means of e.g. a platinum catalyst at a high temperature or a method of completely oxidizing it by means of a titania ($TiO_2$) catalyst at room temperature under irradiation with ultraviolet light, after aspirating and evaporating water by e.g. stripping, has been considered.

It is possible to completely decompose an organic chlorine compound such as trichloroethylene by either of the above two methods, but the treatment is carried out after water is evaporated in these methods, whereby utilizing efficiency of water tends to decrease.

However, in a case where a $TiO_2$ type photocatalyst is used, a method of mixing said photocatalyst with a solution containing an organic chlorine compound, followed by irradiation with light to decompose the organic chlorine compound, or a method of forming the $TiO_2$ type photocatalyst into a thin film, followed by irradiation with light while passing a solution containing an organic chlorine compound on the film to decompose the organic chlorine compound, are proposed. However, in either case, although utilization efficiency of water will improve, intensity of light tends to decay in water, and accordingly the decomposition rate tends to significantly decrease as compared with a method of bringing an organic chlorine compound in a gaseous state into contact with a photocatalyst and decomposing the organic chlorine compound under irradiation with light. Further, no adequate effect of a clarification method by a conventional photocatalyst can be obtained for clarification of contaminated soil.

SUMMARY OF THE INVENTION

Under these circumstances, the present invention has been made to overcome the above problems, and provides a method of quickly decomposing and removing an organic chlorine compound hazardous to the body, contained in e.g. ground water, river water, water in water supply and sewerage system, industrial water or contaminated soil, by using a hollandite-type photocatalyst with a small amount of light energy so that the organic chlorine compound undergoes oxidative destruction more quickly and completely as compared with a method of bringing an organic chlorine compound in a gaseous state into contact with said photocatalyst, followed by irradiation with light for decomposition, or a method of bringing said photocatalyst into contact with an organic chlorine compound contained in a liquid by means of e.g. mixing, followed by irradiation with light for decomposition.

The present inventors have conducted extensive studies to develop a photocatalyst having a photocatalytic activity to completely remove an organic chlorine compound contained in water with a small amount of light energy in air, and having excellent durability, and as a result, have found that by a method of coating a liquid containing an organic chlorine compound on the surface of a photocatalyst comprising a hollandite-type crystal phase represented by the formula:

$$A_xM_yN_{8-y}O_{16}$$

(wherein A is at least one element selected from the group consisting of K, Rb, Cs, Ca, Ba and Na, M is a bivalent or trivalent metal element, N is an element which forms a rutile-type oxide, such as Ti, Sn or Mn, provided that A may be a Na element, only when M is Cr, and x and y satisfy $0.7 < x \leq 2.0$ and $0.7 < y \leq 2.0$, respectively), followed by irradiation with light in air to decompose the organic chlorine compound, an organic chlorine compound undergoes oxidative destruction more quickly and completely as compared with a method of bringing an organic compound in a gaseous state into contact with said photocatalyst, followed by irradiation with light for decomposition, or a method of bringing said photocatalyst into contact with an organic chlorine compound contained in a liquid by means of e.g. mixing or stirring, followed by irradiation with light for decomposition, and that the above method is excellent also in durability.

BRIEF DESCRIPTION OF THE DRAWINGS

FIG. 1 is an X-ray diffraction pattern of the catalyst prepared in Example 1.

DETAILED DESCRIPTION OF THE PREFERRED EMBODIMENTS

The photocatalyst to be used in the method of removing organic chlorine of the present invention is a catalyst comprising a hollandite-type crystal phase represented by the formula:

$$A_xM_yN_{8-y}O_{16}$$

(wherein A is at least one element selected from the group consisting of K, Rb, Cs, Ca, Ba and Na, M is a bivalent or trivalent metal element, N is an element which forms a rutile-type oxide, such as Ti, Sn or Mn, provided that A may be a Na element only when M is Cr, and x and y satisfy $0.7 < x \leq 2.0$ and $0.7 < y \leq 2.0$, respectively).

The hollandite-type crystal is a compound having a one-dimensional tunnel structure. The tunnel ion may be an alkali metal ion such as K or an alkaline earth metal ion such as Ba. In a case of Na, the hollandite-type crystal structure can be obtained only by combination with Cr, but by combination with another element, said tunnel structure disappears, and the compound has e.g. a Freudenverjite-type crystal structure, such being unfavorable.

x and y have to satisfy $0.7 < x \leqq 2.0$ and $0.7 < y \leqq 2.0$, respectively, and if x or y is out of this range, an oxide or carbonate of the alkali metal, an oxide or carbonate of the alkaline earth metal, an oxide of the bivalent or trivalent metal and an oxide of Ti tend to precipitate, and the activity tends to significantly decrease.

Further, in a case where Ba is used, from electrical neutrality conditions of the compound, it is preferred that y=x when M is bivalent, and y=2x when M is trivalent. Also in a case where an alkali metal element and an alkaline earth metal element are combined, it is preferred that $0.7 < x < 1.2$ from the same reason. Further, as the bivalent or trivalent metal element to be used in the photocatalyst of the present invention, e.g. Al, Ga, Cr or Mg is preferred in view of forming a halloandite-type crystal structure.

Further, in the method of removing organic chlorine by using the photocatalyst of the present invention, it is possible to quickly and completely oxidize an organic chlorine compound by coating the organic chlorine compound on the halloandite-type compound, followed by irradiation with light in air. As the wavelength of light for irradiation, light having a wavelength longer than that of ultraviolet lights may be used, and it is possible to employ a fluorescent lamp or sunlight. However, the reaction rate tends to decrease along with lengthening of the wavelength, and it is thereby effective to use light in the ultraviolet region, particularly light having a wavelength in the vicinity of 360 nm.

Here, with respect to the effect by the photocatalyst of the present invention obtained by the coating, it is considered that the oxidative destruction proceeds quickly and completely as the contact angle of the organic chlorine compound in a liquid state on the surface of the photocatalyst becomes as close to 0 as possible, during irradiation with light on the surface of the photocatalyst in air. Accordingly, if the liquid containing the organic chlorine compound flows on the photocatalyst during irradiation with light, decrease in the contact angle of the liquid containing the organic chlorine compound on the surface of the photocatalyst will be prevented, and the mechanism to increase the reaction rate is less likely to function. Accordingly, it is unfavorable to let the liquid flow. In order to obtain the effect of the present invention, the liquid containing the organic chlorine compound has to be "coated" on the photocatalyst.

The method of coating the organic chlorine compound in a liquid state is not particularly limited, but it is preferred to uniformly coat the liquid on as smooth surface of the photocatalyst as possible, so as to adequately increase the effect of the photocatalyst of the present invention obtainable by the coating. In order to increase the reaction rate, it is also effective that a noble metal such as platinum, ruthenium or rhodium or an oxide of a noble metal is supported by the photocatalyst.

Since the emission standard of organic chlorine compounds in water is a level of 10 ppm, it is desired that organic chlorine compounds at a higher concentration than this concentration undergo oxidative destruction completely. By the method of coating an organic chlorine compound on the photocatalyst, followed by irradiation with light of the present invention, it is possible to quickly and completely remove organic chlorine compounds at from a ppm level to a concentration of 100%.

On the other hand, in a case of clarification of soil containing organic chlorine compounds, the organic chlorine compounds contained in the soil can be decomposed and removed by thinly spreading the contaminated soil on the hollandite-type catalyst, followed by irradiation with light.

The organic chlorine compound to be the target of the present invention is not particularly limited, and the present invention is applicable to carcinogenic substances such as Trichlene (trichloroethylene) and hexachloro-1,3-butadiene.

The method of irradiation with light of the present invention is not particularly limited, and irradiation with light can be carried out either from inside or outside of a reaction tube on which the catalyst is fixed, according to need.

Further, the hollandite-type catalyst may be used as a powder, or it may be used as a film of a hollandite-type crystal phase obtained by coating the hollandite-type catalyst on the surface of a porous catalyst support, a quartz glass tube, a quartz glass substrate, $TiO_2$ fibers obtained by forming $TiO_2$ as a representative photocatalyst into fibers, a cloth sample having the $TiO_2$ fibers woven two-dimensionally, or a molded product having the $TiO_2$ fibers molded three-dimensionally.

In the case where the catalyst is used as a film, a method of forming a film by soaking in an aqueous solution or non-aqueous solution having the hollandite-type catalyst dispersed therein, a porous catalyst support, a quartz glass tube, a quartz glass substrate, $TiO_2$ fibers as a representative photocatalyst, a cloth sample having the $TiO_2$ fibers woven two-dimensionally, or a molded product having the $TiO_2$ fibers molded three-dimensionally, may, for example, be employed.

It is known that the hollandite-type crystal phase represented by the formula:

$$A_xM_yN_{8-y}O_{16}$$

(wherein A is at least one element selected from the group consisting of K, Rb, Cs, Ca, Ba and Na, M is a bivalent or trivalent metal element, N is an element which forms a rutile-type oxide, such as Ti, Sn or Mn, provided that A may be a Na element only when M is Cr, x and y satisfy $0.7 < x \leqq 2.0$ and $0.7 < y \leqq 2.0$, respectively) may be synthesized by various methods, and the method for producing the hollandite-type catalyst constituting the photocatalyst of the present invention is not particularly limited.

For example, as a solid phase synthesis method, a method of mixing a carbonate of an alkali metal or alkaline earth metal element, titanium oxide and an oxide of a bivalent or trivalent metal element, followed by baking at a temperature of from 1,200 to 1,500° C., may be mentioned. As a liquid phase synthesis method, a co-precipitation method of using an aqueous solution of inorganic salts of e.g. a nitrate of an alkali metal or alkaline earth metal element, titanium chloride and a nitrate of a bivalent or trivalent metal element, dropwise adding said mixed solution into an ammonia water or a mixture of an ammonia water and an aqueous ammonium oxalate solution to obtain a precipitate, washing the precipitate with water, subjecting it to filtration and drying it, followed by baking at a temperature of from 500 to 1,200° C., may be mentioned. As an alkoxide method, a method of mixing alkoxides such as methoxide, ethoxide or butoxide of an alkali metal or alkaline earth metal element and a bivalent or trivalent metal element in a non-aqueous solution, followed by hydrolysis, drying and baking at a temperature of from 800 to 1,200° C., may be mentioned.

With respect to the baking temperature, the hollandite-type crystal structure will be stably formed even at a baking temperature of at least 1,500° C., but baking at a high temperature tends to decrease the specific surface area of the catalyst, and is not so favorable. Further, too long baking tends to decrease the specific surface area.

When the hollandite-type catalyst has a specific surface area of at least about 1 m²/g, an organic chlorine compound undergoes oxidative destruction and is removed completely. The efficiency of the catalyst for removing the organic chlorine compound becomes high along with increases in the specific surface area, and particularly when the amount of the organic chlorine compound to be treated is large, the specific surface area is preferably large. Further, the porous structure also has a significant influence on the efficiency for removing the organic chlorine compound, and it is particularly effective to use a porous product having pore sizes distributed in a mesopore region.

The reason why an excellent effect can be obtained by the method of the present invention is unexplained in detail, but it is considered that the contact angle of the organic chlorine compound on the surface of the hollandite-type catalyst significantly decreases by irradiation with light, whereby the affinity increases, and as a result, the reactivity significantly improves, and accordingly the oxidative destruction reaction proceeds more quickly than the decomposition of the organic chlorine compound in a gaseous state.

Now, the present invention will be explained in further detail with reference to Examples and Comparative Examples. However, it should be understood that the present invention is by no means restricted to such specific Examples.

EXAMPLE 1

Potassium butoxide (manufactured by Trichemical Kenkyusho), gallium butoxide (manufactured by Trichemical Kenkyusho) and tin ethoxide (manufactured by Trichemical Kenkyusho) were weighed so that the composition would be $K_{1.8}Ga_{1.8}Sn_{6.2}O_{16}$, dissolved in dehydrated 2-methoxyethanol, and the respective solutions were mixed to prepare a sol solution. Then, water for hydrolysis was dropwise added to this solution to conduct hydrolysis. The hydrolyzed gel was dried and pulverized, followed by baking at 1,100° C. for 3 hours to synthesize a single phase powder having a hollandite-type crystal structure. The catalyst thus obtained was a mesopore porous product having a specific surface area of 30 $m^2/g$.

The X-ray diffraction pattern of the catalyst thus obtained is shown in FIG. 1. This powder was put in an In-Situ IR apparatus, and 10 ml of hexachloro-1,3-butadiene at a concentration of 100%, as an example of the organic chlorine compound, was coated on the powder, followed by irradiation with a 400 W xenon lamp in air, and after predetermined times, IR measurement was carried out. With respect to the IR measurement, IR measurement on the surface of the catalyst was carried out firstly, to obtain a value as a background to be subtracted from each measured result, and the measured results were obtained as difference spectrum.

For analysis, a removal ratio was calculated from the following formula (1) using absorption intensities of hexachloro-1,3-butadiene at 856 $cm^{-1}$ and 984 $cm^{-1}$ and absorption intensities after predetermined times, to calculate the efficiency of the oxidative destruction reaction:

$$\text{Removal ratio (\%) of hexachloro-1,3-butadiene} = ((Abs.t_0(856\ cm^{-1}) + Abs.t_0(984\ cm^{-1})) - (Abs.t(856\ cm^{-1}) + Abs.t(984\ cm^{-1})))/((Abs.t_0(856\ cm^{-1}) + Abs.t_0(984\ cm^{-1}))) \quad (1)$$

$Abs.t_0(856\ cm^{-1})$: Absorption intensity of hexachloro-1,3-butadiene at 856 $cm^{-1}$ before irradiation with light $Abs.t_0(984\ cm^{-1})$: Absorption intensity of hexachloro-1,3-butadiene at 984 $cm^{-1}$ before irradiation with light $Abs.t(856\ cm^{-1})$: Absorption intensity of hexachloro-1,3-butadiene at 856 $cm^{-1}$ after t hours $Abs.t(984\ cm^{-1})$: Absorption intensity of hexachloro-1,3-butadiene at 984 $cm^{-1}$ after irradiation with light Changes in the degree of conversion with time of irradiation with light calculated based on the formula (1) are shown in Table 1. Further, results of IR measurement of hexachloro-1,3-butadiene on the surface of the catalyst after predetermined times, without irradiation with light, are shown in Table 1 as results of a dark reaction. From the results of the dark reaction, it was confirmed that there is no change in removal ratio of hexachloro-1,3-butadiene on the surface of the catalyst, if no irradiation with light is carried out. Further, as evident from the results in Table 1, hexachloro-1,3-butadiene reduced along with the time of irradiation with light, completely underwent oxidative destruction in 96 hours and disappeared from the surface of the catalyst. From the results, it was confirmed that hexachloro-1,3-butadiene underwent oxidative destruction and was removed completely by irradiation with light on the surface of the catalyst.

EXAMPLE 2

Gallium oxide (manufactured by Kishida Chemical Co., Ltd.), tin oxide (manufactured by Kishida Chemical Co., Ltd.) and potassium carbonate (manufactured by Kishida Chemical Co., Ltd.) were weighed so that the composition would be $K_{2.0}Ga_{2.0}Sn_{6.0}O_{16}$, and mixed in an agate mortar for 30 minutes, followed by baking at 1,200° C. for 2 hours to synthesize a single phase powder of hollandite-type $K_{2.0}Ga_{2.0}Sn_{6.0}O_{16}$. The catalyst thus obtained had a specific surface area of 5 $m^2/g$. Evaluation of the catalytic activity was carried out in accordance with Example 1. The results are shown in Table 1.

Hexachloro-1,3-butadiene as an example of an organic chlorine compound reduced along with time of irradiation with light, in the same manner as in Example 1, and the degree of conversion was about 51% in 96 hours. From the results, it was confirmed that oxidative destruction reaction proceeded completely by irradiation with light on the surface of the catalyst, and a part of the organic chlorine compound was removed.

EXAMPLE 3

Titanium oxide (manufactured by Kishida Chemical Co., Ltd.), aluminum oxide (manufactured by Kishida Chemical Co., Ltd.) and potassium carbonate (manufactured by Kishida Chemical Co., Ltd.) were weighed so that the composition would be $K_{1.7}Al_{1.7}Ti_{6.3}O_{16}$, and mixed in an gate mortar for 30 minutes, followed by baking at 1,200° C. for 2 hours to synthesize a single phase powder of hollandite-type $K_{1.7}Al_{1.7}Ti_{6.3}O_{16}$. The catalyst thus obtained had a specific surface area of 5 $m^2/g$. Evaluation of the catalytic activity was carried out in accordance with Example 1. The results are shown in Table 1.

Hexachloro-1,3-butadiene as an example of an organic chlorine compound reduced along with time of irradiation with light, in the same manner as in Example 1, and the degree of conversion was about 45% in 96 hours. From the results, it was confirmed that oxidative destruction reaction proceeded completely by irradiation with light on the surface of the catalyst, and a part of the organic chlorine compound was removed.

EXAMPLE 4

Potassium butoxide (manufactured by Trichemical Kenkyusho), gallium butoxide (manufactured by Trichemical Kenkyusho) and tin ethoxide (manufactured by Trichemical Kenkyusho) were weighed so that the composition would be $K_{1.4}Ga_{1.4}Sn_{6.6}O_{16}$, and a single phase powder having a hollandite-type crystal structure was synthesized in accordance with the method of Example 1. The catalyst thus obtained was a mesopore porous product having a specific surface area of 38 m$^2$/g. Further, evaluation of the catalytic activity was carried out in accordance with Example 1, and the results are shown in Table 1.

In the same manner as the above Examples, hexachloro-1,3-butadiene as one example of an organic chlorine compound reduced along with time of irradiation with light, and the degree of conversion was about 95% in 96 hours. From the results, it was confirmed that oxidative destruction reaction proceeded completely by irradiation with light on the surface of the catalyst, and the organic chlorine compound was removed substantially completely.

EXAMPLE 5

Potassium butoxide (manufactured by Trichemical Kenkyusho), gallium butoxide (manufactured by Trichemical Kenkyusho) and manganese ethoxide (manufactured by Trichemical Kenkyusho) were weighed so that the composition would be $K_{1.8}Ga_{1.8}Mn_{6.2}O_{16}$, and a single phase powder having a hollandite-type crystal structure was synthesized in accordance with the method of Example 3. The catalyst thus obtained was a mesopore porous product having a specific surface area of 30 m$^2$/g. Further, evaluation of the catalytic activity was carried out in accordance with Example 1, and the results are shown in Table 1.

In the same manner as the above Examples, hexachloro-1,3-butadiene as one example of an organic chlorine compound reduced along with time of irradiation with light, and the degree of conversion was about 95% in 96 hours. From the results, it was confirmed that oxidative destruction reaction proceeded completely by irradiation with light on the surface of the catalyst, and the organic chlorine compound was removed substantially completely.

EXAMPLE 6

Sodium butoxide (manufactured by Trichemical Kenkyusho), chromium butoxide (manufactured by Trichemical Kenkyusho) and tin ethoxide (manufactured by Trichemical Kenkyusho) were weighed so that the composition would be $Na_{1.8}Cr_{1.8}Sn_{6.2}O_{16}$, and a single phase powder having a hollandite-type crystal structure was synthesized in accordance with the method of Example 3. The catalyst thus obtained was a mesopore porous product having a specific surface area of 20 m$^2$/g. Further, evaluation of the catalytic activity was carried out in accordance with Example 1, and the results are shown in Table 1.

In the same manner as the above Examples, hexachloro-1,3-butadiene as one example of an organic chlorine compound reduced along with time of irradiation with light, and the degree of conversion was about 81% in 96 hours. From the results, it was confirmed that oxidative destruction reaction proceeded completely by irradiation with light on the surface of the catalyst, and the organic chlorine compound was removed substantially completely.

EXAMPLE 7

A hollandite single phase powder was synthesized in accordance with the method of Example 1 so that the composition would be $K_{1.8}Ga_{1.8}Sn_{6.2}O_{16}$. This powder was put in an In-Situ IR apparatus, and sand impregnated with hexachloro-1,3-butadiene at a concentration of 100% was thinly spread on the surface of the catalyst, followed by irradiation with a 400W xenon lamp in air, and after predetermined times, IR measurement was carried out. With respect to IR measurement, sand impregnated with no organic chlorine compound was thinly spread on the surface of the catalyst, and IR measurement was carried out to obtain a value as a background to be subtracted from each measured result, and the measured results were obtained as difference spectrum. Evaluation of the catalytic activity was carried out in accordance with Example 1, and the results are shown in Table 1.

In the same manner as in the above Examples, hexachloro-1,3-butadiene reduced along with time of irradiation with light, and the degree of conversion was about 80% in 96 hours. From the results, it was confirmed that oxidative destruction reaction proceeded completely by irradiation with light on the surface of the catalyst, and the organic chlorine compound contained in sand was removed substantially completely.

TABLE 1

Removal ratio (%) of hexachloro-1,3-butadiene
Time (h) of irradiation with light

|  | 0 | 4 | 12 | 24 | 48 | 72 | 96 |
|---|---|---|---|---|---|---|---|
| Example 1 | 0 | 12 | 38 | 49 | 61 | 86 | 100 |
| Example 2 | 0 | 8 | 19 | 28 | 37 | 45 | 51 |
| Example 3 | 0 | 10 | 19 | 24 | 35 | 41 | 45 |
| Example 4 | 0 | 11 | 28 | 42 | 51 | 79 | 95 |
| Example 5 | 0 | 10 | 27 | 41 | 51 | 78 | 95 |
| Example 6 | 0 | 10 | 24 | 39 | 48 | 70 | 81 |
| Dark reaction (no irradiation with light) | 0 | 0 | 0 | 0 | 0 | 0 | 0 |
| Comparative Example 1 | 0 | 1 | 3 | 3 | 3 | 4 | 4 |
| Comparative Example 2 | 0 | 2 | 4 | 4 | 4 | 5 | 5 |
| Comparative Example 3 | 0 | 5 | 7 | 10 | 13 | 16 | 18 |
| Comparative Example 4 | 0 | 2 | 3 | 3 | 4 | 4 | 5 |
| Comparative Example 5 | 0 | 6 | 13 | 20 | 33 | 41 | 52 |
| Comparative Example 6 | 0 | 5 | 7 | 10 | 14 | 20 | 31 |

COMPARATIVE EXAMPLE 1

Titanium oxide (manufactured by Kishida Chemical Co., Ltd.), aluminum oxide (manufactured by Kishida Chemical Co., Ltd.) and potassium carbonate (manufactured by Kishida Chemical Co., Ltd.) were weighed so that the composition would be $K_{2.5}Al_{2.5}Ti_{5.5}O_{16}$, and mixed in an agate mortar for 30 minutes, followed by baking at 1,200° C. for 2 hours to obtain a powder. The obtained powder had a mixed phase comprising an extremely small amount of a hollandite-type crystal phase, and potassium hexatitanate and aluminum oxide. Evaluation of the activity of the catalyst was carried out in accordance with Example 1. The results are shown in Table 1.

COMPARATIVE EXAMPLE 2

Tin oxide (manufactured by Kishida Chemical Co., Ltd.), gallium oxide (manufactured by Kishida Chemical Co., Ltd.) and potassium carbonate (manufactured by Kishida Chemical Co., Ltd.) were weighed so that the composition would be $K_{0.3}Ga_{0.3}Sn_{7.7}O_{16}$, and mixed in an agate mortar for 30 minutes, followed by baking at 1,200° C. for 2 hours to obtain a powder. The obtained powder had a mixed phase comprising an extremely small amount of a hollandite-type crystal phase, and tin oxide and gallium oxide. Evaluation of the activity of the catalyst was carried out in accordance with Example 1. The results are shown in Table 1.

COMPARATIVE EXAMPLE 3

Potassium butoxide (manufactured by Trichemical Kenkyusho), gallium butoxide (manufactured by Trichemical Kenkyusho) and titanium ethoxide (manufactured by Trichemical Kenkyusho) were weighed so that the composition would be $K_{0.01}Ga_{0.01}Ti_{7.99}O_{16}$, dissolved in dehydrated 2-methoxyethanol, and the respective solutions were mixed to prepare a starting sol solution. Then, water for hydrolysis was dropwise added to this solution to conduct hydrolysis. The hydrolyzed gel was dried and pulverized, followed by baking at 1,100° C. for 3 hours. The catalyst thus obtained was a mixture consisting mainly of a rutile phase and a small amount of gallium oxide, and had a specific surface area of 20 $m^2/g$. Evaluation of the activity of the catalyst was carried out in accordance with Example 1, and the results are shown in Table 1.

COMPARATIVE EXAMPLE 4

Using a powder of titanium oxide (anatase type, tradename: P-25, specific surface area: 40 $m^2/g$), evaluation of the catalytic activity was carried out in accordance with Example 1. The results are shown in Table 1.

COMPARATIVE EXAMPLE 5

Using a catalyst powder obtained by the method of Example 1, evaluation of the catalytic activity was carried out in the same manner as in Example 1 except that vaporized hexachloro-1,3-butadiene at a concentration of 100% was sprayed on the surface of the catalyst, instead of coating. The results are shown in Table 1. In the present Comparative Example, the analysis of the gas was carried out by means of a mass spectrometer mounted on an IR analyzer, to evaluate the removal ratio of hexachloro-1,3-butadiene from the following formula (2):

$$\text{Removal ratio (\%) of hexachloro-1,3-butadiene} = (C.t_0 - C.t)/C.t_0 \quad (2)$$

$C.t_0$: Concentration of vaporized hexachloro-1,3-butadiene before irradiation with light.

$C.t$: Concentration of vaporized hexachloro-1,3-butadiene after irradiation with light for t hours.

COMPARATIVE EXAMPLE 6

Using a powder of titanium oxide (anatase type, tradename: P-25, specific surface area: 40 $m^2/g$), evaluation of the catalytic activity was carried out in accordance with Comparative Example 5, and the results are shown in Table 1.

In Comparative Examples 1 to 6, the removal ratio of hexachloro-1,3-butadiene was low even after 96 hours of irradiation with light.

What is claimed is:

1. A method, comprising:
    coating a liquid comprising hexachloro-1,3-butadiene on the surface of a photocatalyst so that the liquid does not flow, wherein said photocatalyst has a surface area of at least 1 $m^2/g$ and comprises a hollandite crystal phase of formula: $K_xGa_xSn_{8-x}O_{16}$ wherein $1.6 \leq x \leq 2.0$; and
    irradiating the photocatalyst to remove said hexachloro-1,3-butadiene.

2. The method according to claim 1, wherein the irradiating is performed so that the hexachloro-1,3-butadiene is 100% converted within 100 hours.

3. The method according to claim 1, wherein the irradiating is performed so that the hexachloro-1,3-butadiene is 80% converted within 100 hours.

4. The method according to claim 1, wherein the irradiating is performed so that the hexachloro-1,3-butadiene is 50% converted within 100 hours.

5. The method according to claim 1, further comprising dispersing sand on the surface of the photo catalyst.

6. The method according to claim 3, further comprising impregnating the hexachloro-1,3-butadiene in the sand.

7. The method according to claim 1, wherein the catalyst has a surface area of from 1 to 10 $m^2/g$.

8. A method, comprising:
    coating a liquid comprising hexachloro-1,3-butadiene on the surface of a photocatalyst so that the liquid does not flow, wherein said photocatalyst has a surface area of at least 1 $m^2/g$ and comprises a hollandite crystal phase of formula: $K_xAl_xTi_{8-x}O_{16}$ wherein $1.6 \leq x \leq 2.0$; and
    irradiating the photocatalyst to remove said hexachloro-1,3-butadiene.

9. The method according to claim 8, wherein the irradiating is performed so that the hexachloro-1,3-butadiene is 100% converted within 100 hours.

10. The method according to claim 8, wherein the irradiating is performed so that the hexachloro-1,3-butadiene is 90% converted within 100 hours.

11. The method according to claim 8, wherein the irradiating is performed so that the hexachloro-1,3-butadiene is 50% converted within 100 hours.

12. The method according to claim 8, further comprising dispersing sand on the surface of the photocatalyst.

13. The method according to claim 12, further comprising impregnating the hexachloro-1,3-butadiene in the sand.

14. The method according to claim 8, wherein the catalyst has a surface area of from 1 to 10 $m^2/g$.

15. A method, comprising:
    coating a liquid comprising hexachloro-1,3-butadiene on the surface of a photocatalyst so that the liquid does not flow, wherein said photocatalyst has a surface area of at least 1 $m^2/g$ and comprises a hollandite crystal phase of formula: $K_xGa_xMn_{8-x}O_{16}$ wherein $1.6 \leq x \leq 2.0$; and
    irradiating the photocatalyst to remove said hexachloro-1,3-butadiene.

16. The method according to claim 15, wherein the irradiating is performed so that the hexachloro-1,3-butadiene is 100% converted within 100 hours.

17. The method according to claim 15, wherein the irradiating is performed so that the hexachloro-1,3-butadiene is 90% converted within 100 hours.

18. The method according to claim 15, wherein the irradiating is performed so that the hexachloro-1,3-butadiene is 50% converted within 100 hours.

19. The method according to claim 15, further comprising dispersing sand on the surface of the photocatalyst.

20. The method according to claim 19, further comprising impregnating the hexachloro-1,3-butadiene in the sand.

21. The method according to claim 15, wherein the catalyst has a surface area of from 1 to 10 $m^2/g$.

\* \* \* \* \*